United States Patent [19]
Blickenstaff et al.

[11] Patent Number: 5,537,585
[45] Date of Patent: Jul. 16, 1996

[54] DATA STORAGE MANAGEMENT FOR NETWORK INTERCONNECTED PROCESSORS

[75] Inventors: Ronald L. Blickenstaff; Catherine I. Brant, both of Boulder; Paul D. Dodd, Niwot; Anton H. Kirchner, Boulder; Jennifer K. Montez, Thornton; Brian E. Trede, Boulder; Richard A. Winter, Longmont, all of Colo.

[73] Assignee: Avail Systems Corporation, Boulder, Colo.

[21] Appl. No.: 201,658

[22] Filed: Feb. 25, 1994

[51] Int. Cl.⁶ ..................................................... G06F 17/30
[52] U.S. Cl. .................... 395/600; 395/440; 395/444; 395/800; 364/222.81; 364/281.6; 364/962; 364/974; 364/DIG. 1; 364/DIG. 2
[58] Field of Search ................................ 395/600, 800, 395/440, 444

[56] References Cited

U.S. PATENT DOCUMENTS

| | | | |
|---|---|---|---|
| 4,638,424 | 1/1987 | Beglin | 395/444 |
| 5,155,835 | 10/1992 | Belsan | 395/441 |
| 5,193,171 | 3/1993 | Shinmura | 395/440 |
| 5,218,695 | 6/1993 | Noveck et al. | 395/600 |
| 5,276,860 | 1/1994 | Fortier et al. | 395/575 |
| 5,276,867 | 1/1994 | Kenley et al. | 395/600 |
| 5,313,631 | 5/1994 | Kao | 395/600 |
| 5,325,505 | 6/1994 | Hoffecker et al. | 395/600 |
| 5,367,698 | 11/1994 | Webber et al. | 395/800 |
| 5,475,834 | 12/1995 | Anglin | 395/600 |

FOREIGN PATENT DOCUMENTS

WO92/09035  11/1990  WIPO.

OTHER PUBLICATIONS

R. D. Christman, "Experience With File Migration", *Report #LA 9014-MS, UC-32*, Los Alamos National Laboratories, 1981, pp. 1-13.

Thompson et al., "The Design and Use of a 2 Terabyte Optical Archival Store", *IEEE Transactions on Nuclear Science*, vol. 35, No. 1, Feb., 1988, pp. 243-247.

Thanhardt et al., "File Migration in the NCAR Mass Storage System", *Ninth IEEE Symposium on Mass Storage Systems*, Monterey, Califoria, 31 Oct.—3 Nov., 1988, pp. 114-121.

Anna Hac, "A Distributed Algorithm for Performance Improrvement Through File Migration, and Process Migration", *IEEE Transactions on Software Engineering*, vol. 15, No. 11, Nov. 1989, pp. 1459-1470.

David A. Arneson, "Development of Omniserver", *Tenth IEEE Symposium on Mass Storage Systems*, IEEE Computer Society Press, 1990, pp. 88-93.

Bhasker et al., "Architecture and Implementation of an On–Line Data Archive and Distribution System", *Proceedings of the Twelfth IEEE Symposium on Mass Storage Systems. Putting All That Data to Work*, Monterey, California, 26–29 Apr. 1993, pp. 177–182.

Hurley et al., "Potential Benefits of File Migration in a Heterogeneous Distributed File System", *Proceedings ICCI '93. Fifth International Conference on Computing and Information*, Sudbury, Ontario Canada, 27–29 May 1993, pp. 123–127.

(List continued on next page.)

*Primary Examiner*—Thomas G. Black
*Assistant Examiner*—Paul R. Lintz
*Attorney, Agent, or Firm*—Duft, Graziano & Forest

[57] ABSTRACT

The data storage system is connected to a local area network and includes a storage server that on a demand basis and/or on a periodically scheduled basis audits the activity on each volume of each data storage device that is connected to the network. Low priority data files are migrated via the network and the storage server to backend data storage media, and the directory resident in the data storage device is updated with a placeholder entry to indicate that this data file has been migrated to backend storage. When the processor requests this data file, the placeholder entry enables the storage server to recall the requested data file to the data storage device from which it originated.

85 Claims, 9 Drawing Sheets

OTHER PUBLICATIONS

Article: Renaissance: Managing The Network Computer And its Storage Requirements by Antony Foster and David Habermehl from the Eleventh IEEE Syposium on Mass Storage Systems.

Article: The IBM 3850: A Mass Storage System With Disk Characteristics by Clayton T. Johnson, published in Proceedings Of the IEEE, vol. 63, No. 8.

Article: Migrating Data To Cheaper Storage by Salvatore Salamone, from Data Communications 22 (1993) Aug., No. 11.

DATA STORAGE MANAGEMENT FOR NETWORK INTERCONNECTED PROCESSORS

FIELD OF THE INVENTION

This invention relates to data communication networks, such as local area networks, that function to interconnect a plurality of data processors with data storage subsystems, and to a data storage management system that automatically migrates low priority data files from the data storage subsystems to backend data storage to provide more available data storage space in the data storage subsystems.

PROBLEM

It is a problem in the field of local area networks to provide both adequate data storage resources for the processors connected to the network as well as efficient data storage management capability associated with the data storage subsystems that are connected to the network and which serve the processors. Existing local area networks interconnect a plurality of processors with a number of data storage devices, also termed data storage subsystems, on which are stored the data files used by the processors. The term data files is used to characterize the various data that can be stored on memory devices and includes data managed by file servers, databases, application servers, and note systems, which systems are collectively termed "file servers" herein. Typically, the data storage subsystems are individual magnetic disk drives or disk drive array data storage subsystems.

A problem with this network configuration is that these data storage subsystems are very expensive. A significant portion of the data that is stored thereon is little used and cannot justify the use of expensive data storage media. In the corresponding area of data storage management, there is typically no management of the data files that are stored on these data storage subsystems that are directly connected to the network. A data storage management activity is typically initiated only in response to a processor encountering inadequate available data storage space on the data storage subsystems. At this point, a user typically manually deletes various unused or little used data files or manually rewrites these data files to another media, such as magnetic tape, that can be placed in archive storage for availability at a later time. This data storage management philosophy is highly inefficient in that data processing operations must cease while a user manually removes data files from the data storage subsystem to obtain additional data storage space. This form of manual data storage space allocation is inefficient since some of the data files that are deleted or archived may not be the best candidates for such processing. Furthermore, the data storage media remains unmanaged between these randomly occurring spurts of data management activity.

Alternatively, the user can add another disk drive to the network to provide incremental additional data storage space. The cost of additional disk drives is an incremental increase in network cost, but represents an inefficient expenditure of data storage resources. While there is a significant increase in the data storage capacity of devices that are typically connected to a local area network, the user's inclination to create data and load additional software onto the processor and the data storage media far exceeds the data storage capacity improvement on a time-wise basis of the various devices that are connected to the local area network. Therefore, significant increases in data storage capacity are typically implemented at a very high cost, since there presently exists no system architecture or data management capability that can efficiently make use of less expensive media to store lower priority data files or automatically manage the data files that are stored on the data storage subsystems connected to the network.

SOLUTION

The above-described problems are solved and a technical advance achieved in the field by the data storage management system of the present invention. The data storage management system is connected to the network and provides a hierarchical data storage capability to migrate lower priority data files from the data storage subsystems that are connected to the network to backend less expensive data storage media, such as optical disks or magnetic tape. A data storage management capability is also included to provide automated disaster recovery data backup and data space management capability.

The data storage management system implements a virtual data storage system, comprising a plurality of virtual file systems, for the processors that are connected to the network. The virtual data storage system consists of a first section that comprises a plurality of data storage subsystems, each consisting of file servers and their associated data storage devices, which are connected to the network and serve the processors. A second section of the virtual data storage system comprises the storage server, consisting of a storage server processor and at least one layer of hierarchically arranged data storage devices, that provides backend data storage space. The storage server processor interfaces to software components stored in each processor and file server that is connected to the network. The storage server, on a demand basis and/or on a periodically scheduled basis, audits the activity on each volume of each data storage device that is connected to the network. Data files that are of lower priority are migrated via the network and the storage server to backend data storage media. The data file directory resident in the data storage device that originally contained this data file is updated with a placeholder entry in the directory to indicate that this data file has been migrated to backend data storage. Therefore, when a processor requests this data file, the placeholder entry is retrieved from the directory and the storage server is notified that the requested data file has been migrated to backend storage and must be recalled to the data storage device from which it originated. The storage server automatically retrieves the requested data file using information stored in the placeholder entry and transmits the retrieved data file to the data storage device from whence it originally came. The storage server, backend data storage and processor resident software modules create a virtual storage capacity for each of the data storage devices in a manner that is transparent to both the processor and the user. Each virtual volume in this system can be expanded in extent in a seamless manner to match the needs of the processor by using low cost mass storage devices.

In operation, the storage server monitors the amount of available data storage space on each of the volumes (network volumes) on each of the data storage devices to ensure that adequate data storage space is available to the processors on a continuing basis. When the available data storage space drops below a predetermined threshold, the storage server reviews the activity levels of the various data files that are stored therein and automatically migrates the lower priority data files to the backend data storage as described above. Furthermore, the backend data storage is similarly managed with the lower priority data files being migrated from layer to layer within the multi-layer hierarchical data storage as a function of their activity level, content and the amount of available data storage space on these various layers. Therefore, each layer of the hierarchical storage is populated by data files whose usage pattern and priority is appropriate to that layer or type of media. The data storage devices can be viewed as comprising a first layer of this data storage hierarchy while a backend disk drive or disk drive array can be a second layer of this data storage hierarchy. Successive layers of this hierarchy of data storage devices can incorporate optical disks, and/or magnetic tape, and/or automated media storage and retrieval libraries, and/or manual media storage and retrieval libraries.

When a data file is recalled by the storage server, it is transmitted from its backend data storage location directly to a data storage device, where it is accessed by the requesting processor. The data file remains on this data storage device until it is migrated to backend storage as a function of the normal audit and migration procedures of the storage server.

Additional services and capabilities are provided by this system, such as shadow copy of the data files wherein the second layer of the hierarchy can include redundant data storage devices such that all of the data that is stored on the active ones of these data storage devices are replicated on another data storage device to ensure that the data that is stored thereon is immediately available. Furthermore, the storage server can automatically initiate full volume backups by writing all the data stored on a selected level of the hierarchical data storage system onto a backup media, such as magnetic tape, on a periodic basis. This enables the data storage system to provide disaster recovery on automated basis for the user since, if one of the data storage devices located in the backend data storage fails, its data are also stored on a backup media that can be contained in, for example, an automated magnetic tape cartridge library. The data of the failed hierarchical data storage device can then be automatically reconstructed by the storage server retrieving the backup copy of the data files that were written on the failed data storage device and transmitting those data files to a replacement hierarchical data storage device for access by the requesting processor.

DETAILED DESCRIPTION

Figure 1:
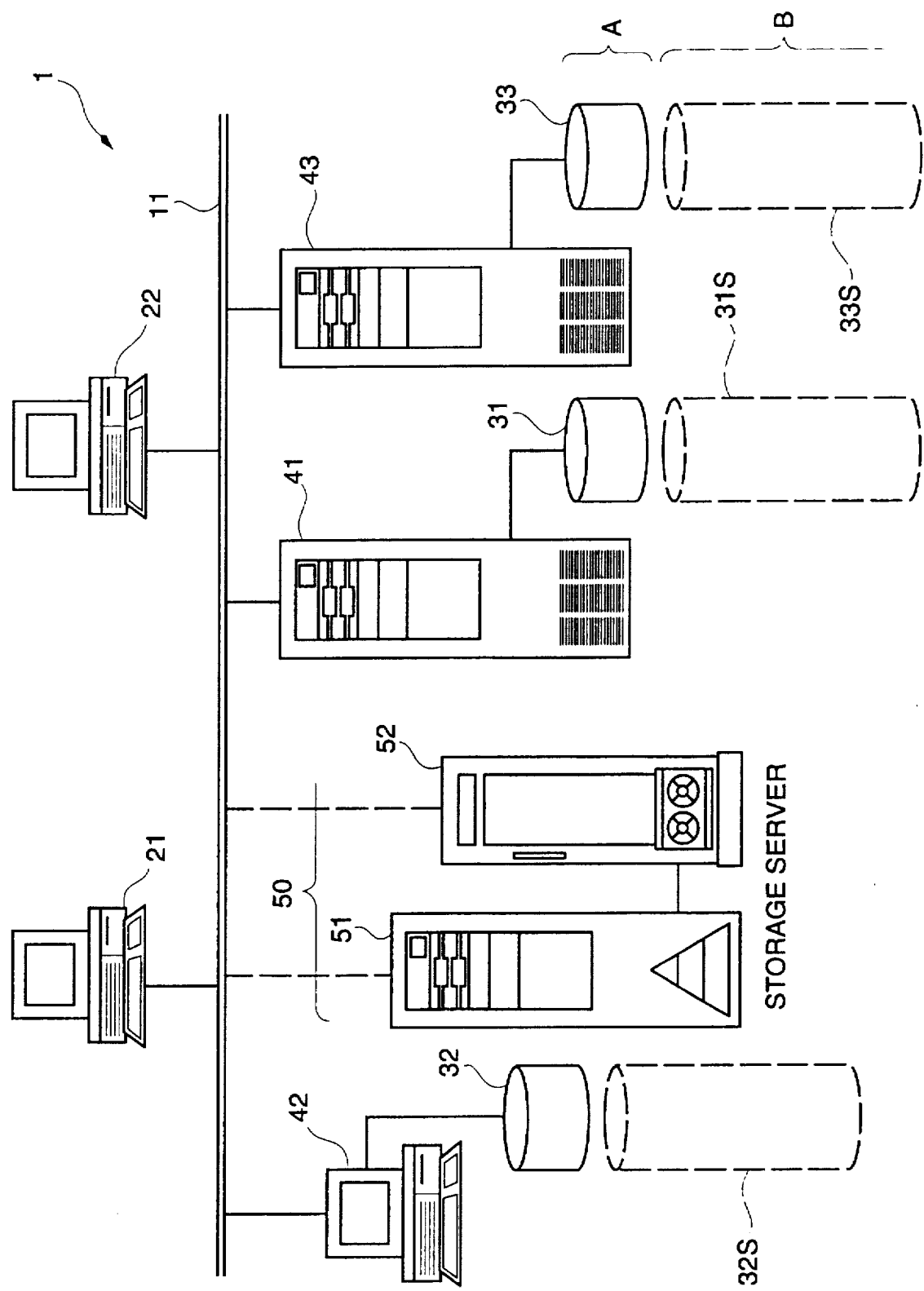
FIG. 1 illustrates in block diagram form the overall architecture of a typical local area network that includes the data storage management system of the present invention.

Local area networks are increasingly becoming an integral feature in the business environment. FIG. 1 illustrates in block diagram form the overall architecture of a typical local area network 1 and the incorporation of the data storage management system of the present invention into the local area network 1. A local area network 1 consists of data communication link 11 and software (not shown) that interconnects a plurality of processors 21, 22 with a number of file servers 41–43. The processors can be personal computers, work stations, mini-computers or any other processing element. For the simplicity of description, all of these devices are described by the generic term "processor". While many of these processors 21, 22 may contain a significant amount of data storage capacity, it is not uncommon for a local area network 1 to be equipped with additional data storage capacity to supplement that of the processors 21, 22 themselves. The data storage devices 31–33 that are connected to the data communication link 11 of the local area network 1 are typically high-speed random access devices, such as high capacity disk drives or even disk drive arrays, to thereby substantially be compatible with the operating speed of the processors 21, 22 and the data communication link 11. Each data storage device 31–33 is included in a file server 41, work station 42 or other type of server 43, which functions as an interface between the network 1 and the data storage device 31–33, such as a disk drive. For simplicity of description, the data storage capacity provided by the file server 41–43 and its associated data storage device 31–33 is referred to as "file server" herein.

Each processor 21 that is connected to the local area network 1 is typically capable of accessing at least one volume on one of these file servers 41 as directly accessible additional data storage space for the use of this processor 21 to store data files. The term data files is used to characterize the various data that can be stored on data storage devices and includes data managed by file servers, databases, application servers, and note systems, which are collectively referred to as "file servers" herein. In this system, the local area network 1 provides a communication fabric over which processors 21, 22 and the file servers 41–43 communicate via a predetermined protocol. The disclosed configuration and implementation of the local area network 1 and its protocol, processors 21, 22, file servers 41–43 as described herein are simply illustrative of the invention and there are numerous alternate embodiments of this system that are possible.

In addition to the processors 21, 22 and the file servers 41–43, the data storage management system of the present invention includes the data storage management apparatus connected to the local area network 1. This data storage management apparatus comprises a storage server 50 that is connected to the local area network 1. A storage server processor 51 serves to interface the local area network 1 with the backend data storage devices 61–65 (FIG. 4) that constitute the secondary storage 52. The backend data storage devices 61–65, in combination with the file servers 41–43 comprise a hierarchical data storage system. The backend data storage devices 61–65 typically include at least one layer of data storage that is less costly than the dedicated data storage devices 31–33 of the file servers 41–43 to provide a more cost-effective data storage capacity for the processors 21, 22. The data storage management system implements a virtual data storage space for the processors 21, 22 that are connected to the local area network 1. The virtual data storage space consists of a first section A that comprises a primary data storage device 31 that is connected to the network 1 and used by processors 21, 22. A second section B of the virtual memory comprises the secondary storage 52 managed by the storage server processor 51. The secondary storage 52 provides additional data storage capacity for each of the primary data storage devices 31–33, represented on FIG. 1 as the virtual devices 31S–33S attached in phantom to the primary data storage devices 31–33 of the file servers 41–43. Processor 21 is thereby presented with the image of a greater capacity data storage device 31 than is connected to the file server 41. The storage server 51 interfaces to software components stored in each processor 21, 22 and file server 41–43 that is connected to the local area network 1. The storage server processor 51, on a demand basis and/or on a periodically scheduled basis, audits the activity on each volume of each data storage device 31–33 of the file servers 41–43 that are connected to the network 1. Data files that are of lower priority are migrated via the network 1 and the storage server processor 51 to backend data storage media of the secondary storage 52. The data file directory resident in the file server 41 that originally contained this data file is updated with a placeholder entry in the directory to indicate that this data file has been migrated to backend data storage. Therefore, when the processor 21 requests this data file, the placeholder entry is retrieved from the directory and the storage server processor 51 is notified that the requested data file has been migrated to backend storage and must be recalled to the file server 41 from which it originated. In the case of a processor 21, 22 and 42 that interfaces to a user, the storage server 50 may provide the user with a notification where necessary that a time delay may be noted in accessing the requested data file. The storage server processor 51 automatically retrieves the requested data file and transmits it to the data storage device 31 from whence it originally came. The storage server processor 51, secondary storage 52 and processor resident software modules create a virtual storage capacity for each of the file servers 41–43 in a manner that is transparent to both the processor 21, 22 and the user. Each virtual volume in this system can be expanded in extent in a seamless manner to match the needs of the processors 21, 22 by using low cost mass storage devices to implement the secondary storage 52.

Network Software

Figure 2:
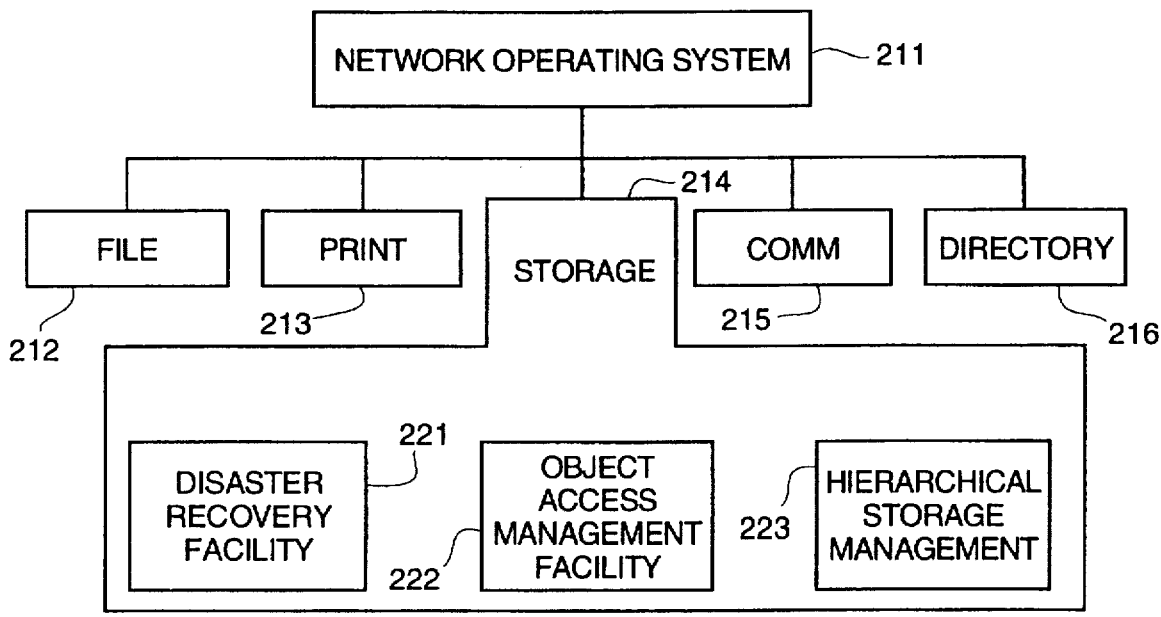
FIG. 2 illustrates in block diagram form the various network software components.

FIG. 2 illustrates in block diagram form the typical components of the network software, including the data storage management software of the present invention. There are a number of network servers presently available on the market, with the Novell NetWare software representing the dominant product in this market. The following description is therefore couched in terms of a NetWare embodiment for simplicity of description, although the invention is not limited to this embodiment.

The network software includes an operating system 211 which functions to provide the basic network framework. In addition, a plurality of modules are provided to support the various functions that are essential to the functioning of the processors that are connected to the network. These modules include, but are not limited to: file management 212, print control 213, data storage management 214, communications 215, data file directory 216.

The data storage management system of the present invention includes data storage devices shown in FIG. 1 as well as data storage management software 214 that is incorporated into the network software. The data storage management software 214 includes a plurality of modules, each of which provide a specific function in the general data storage management task. The modules illustrated in FIG. 2 are: disaster recovery facility 221, object access management facility 222, and hierarchical storage management 223. These modules represent some typical features that are provided to users of the network to enable them to obtain improved data storage efficiency. Within each module there may be a number of additional processes that are incorporated into the category of the listed module.

Hierarchical Storage Management Architecture

Figure 3:
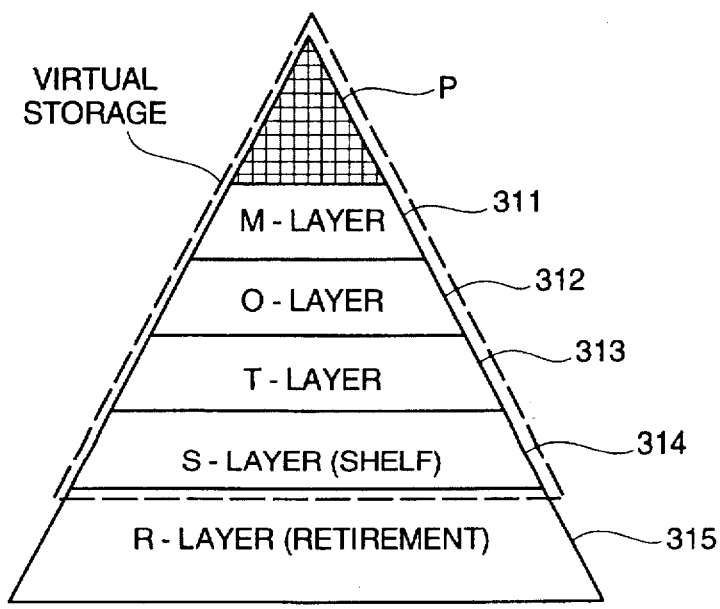
FIG. 3 illustrates in conceptual view the architecture of the hierarchical memory of the data storage management system of the present invention.
Figure 4:
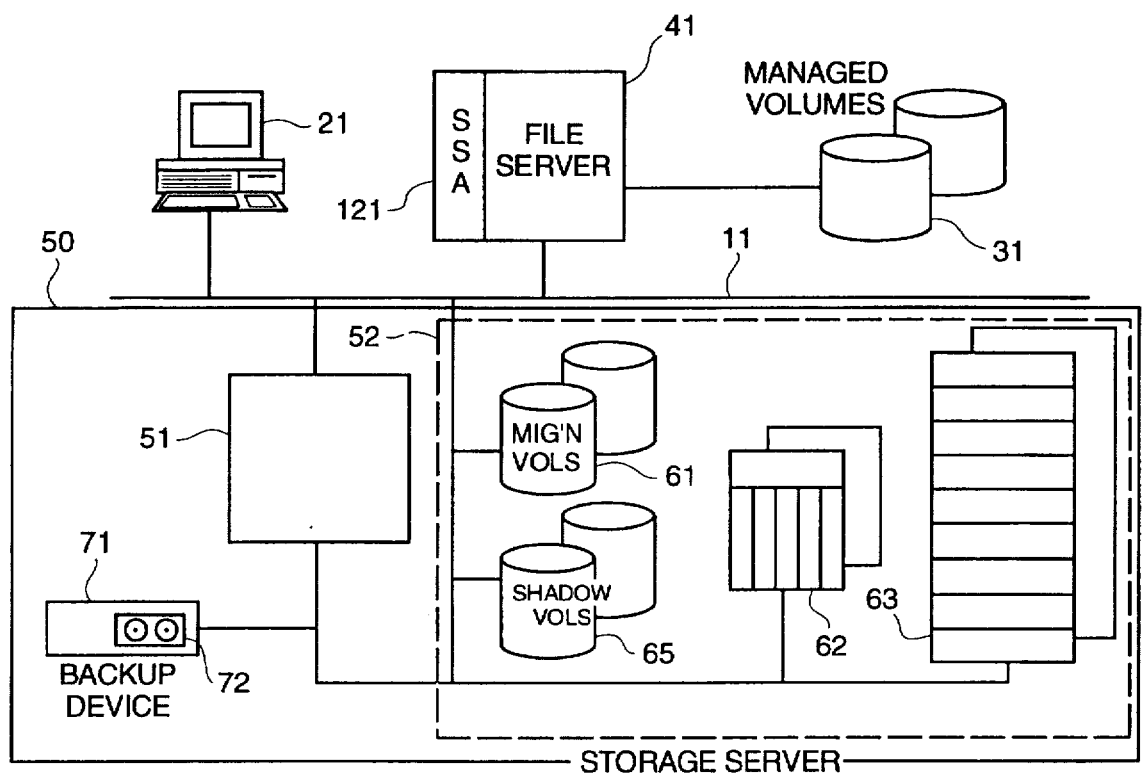
FIG. 4 illustrates a physical implementation of the hierarchical memory of the data storage management system of the present invention.

FIG. 3 illustrates the philosophical architecture and FIG. 4 illustrates one possible hardware implementation of the hierarchical data storage management system. The user at a processor 21 interfaces with a primary data storage device P via the network 1. The primary storage device P consists of a file server 41 and its associated data storage device(s) 31, such as a disk drive. The file server 41 manages the data storage media of the associated data storage device 31 in well known fashion. The data storage device 31 is typically divided into a number of volumes, which can be called network volumes. Additional volumes are provided by the assignment of additional volumes in the same data storage device 31 or the addition of further data storage devices to the network 1.

As illustrated in FIG. 3, the secondary storage 52 is divided into at least one and more likely a plurality of layers 311–313, generally as a function of the media used to implement the data storage devices 61–65. In particular, the second layer 311 of the hierarchical data storage, which is the first layer of the secondary storage 52, can be implemented by high speed magnetic storage devices 61. Such devices include disk drives and disk drive arrays. The third layer 312 of the hierarchical data storage, which is the second layer of the secondary storage 52, can be implemented by optical storage devices 62. Such devices include optical disk drives and robotic media storage and retrieval library systems. The fourth layer 313 of the hierarchical data storage, which is the third layer of the secondary storage 52, can be implemented by slow speed magnetic storage devices 63. Such devices include magnetic tape drives and robotic media storage and retrieval library systems. An additional layer 314 of the hierarchical data storage can be implemented by the use of a "shelf layer", which can be implemented by manual storage of media 64. This disclosed hierarchy is simply illustrative of the data storage management concept and the number, order and implementation of the various layers can differ from that disclosed herein.

As can be seen in FIG. 3, data files can migrate from the file server volumes of the first section A of the virtual memory to the data storage devices 61–65 of the second section B of the virtual memory. In addition, these data files can further be relocated from the first layer 311 of the secondary storage 52 to the second 312 and third layers 313 of the secondary storage 52 as a function of the activity of the data file, as indicated in FIG. 3. Further, the data file can be recalled directly to the file server volumes from any layer of the secondary storage 52.

Shelf Layer

As data files are transmitted to the storage server 51 for migration to secondary storage 52, they are automatically protected from loss in several ways. The data storage devices 61 in the first layer 311 of the second section of the virtual data storage system are typically protected by the use of shadow copies, wherein each data storage device 61 and its contents are replicated by another data storage device 65 and its contents. In addition, as data files are migrated to the storage server 51 for retention, they are packaged into large blocks of data called transfer units. The transfer units are backed up via a backup drive 71 on to a separate backup media 72, such as high density magnetic tape media. Multiple copies of this backup media 72 may be created to provide both off-site and on-site copies for data security. A backup media rotation scheme can be implemented to rotate the backup media between a plurality of locations, typically between an on-site and an off-site location to protect against any physical disasters, such as fire. When the lowest layer 313 of the second section of the virtual data storage space becomes nearly full, the data storage devices 63 that comprise this layer are reviewed to identify the lowest priority transfer units contained thereon. These identified transfer units are deleted from this layer and the secondary storage directories are updated to indicate that the data files contained in these deleted transfer units have been "relocated" to the shelf layer 314. No physical movement of the transfer units or the data files contained therein takes place. The relocation is virtual, since the data files are presently stored on backup media 72 that was created when these identified data files were initially migrated to the first layer of the secondary storage. The placeholder entry for each of the data files contained in the deleted transfer units is not updated, since the data files are still accessible within the data storage system. The secondary storage directories are updated to note that the data files are presently stored on the shelf layer 314 and the identity of the media element 72 that contains this data file is added to the directory entry for this data file. This shelf storage concept is very convenient for temporary overflow situations where free space is required at the lowest layer 313 of the hierarchy but the user has not procured additional data storage devices 63. Where the user subsequently does expand the data storage capacity of this layer, the overflowed data can be retrieved from the shelf storage and placed in the additional data storage space.

When a processor 21 requests access to a data file that is stored in the shelf layer 314, the storage server 51 retrieves the physical storage location data from the secondary storage directory associated with the requested data file. This data includes an identification of the media element 72 that contains the requested data file. The physical location of this media element 72 is dependent on the data read/write activity and configuration of the system. It is not unusual for the identified media element 72 to be mounted on the backup drive 71 that performs the data file backup function. If so, the data file is retrieved from this backup drive 71. If the media element 72 has been removed from the backup drive 71, an operator must retrieve the removed media element 72 and mount this media element on a drive 71 to enable the storage server 51 to recall the requested data file from the media element 72 and transmit the data file to the file server 31 used by the requesting processor 21. The retrieved media element 72 can be mounted on the backup drive 71 or a separate drive can optionally be provided for this purpose to enable the storage server 51 to continually backup data files as they are migrated to secondary storage 52. Thus, the backup media 72 serves two purposes: backup of data files, and shelf layer 314 of storage in the data storage hierarchy.

Retirement Layer

When data files have not been utilized for an extended period of time, they should be removed from the virtual data storage system and placed in another managed data storage system that does not utilize the more expensive automatic resources of the virtual data storage system. It is advantageous to track these retired data files in the event that they need to be retrieved. The retirement layer 315 performs this function. When a data file is retired, it no longer is part of the virtual data storage system and its placeholder entry is deleted from the primary storage directory. In addition, the identification of the data file and any other properties that were recorded in the secondary storage directory are saved and placed in a separate retirement directory. The retired file's placeholder entry, secondary storage directory entry and backup directory entry are deleted.

To simplify the management of the retirement directory, it can be partitioned into segments, each of which lists data files that were last accessed during a designated time period. The structure of the retirement directory can follow the scheme of the underlying virtual file system directory structure, such as a basic tree structure. The virtual file system usually starts at the volume level of the tree, but the directory structure of the retirement directory can be expanded upward to include servers within a defined domain. The domain can represent divisions of a corporation, or any other segmentation of the data files that is conceptually higher than the server level. This expansion enables the storage server 51 to distribute the retirement directory across the local area network 1 for storage by file server 41–43. Any tree searches for a retired data file can then be concurrently performed by the plurality of file servers 41–43. Data files are typically retired as a group that constitutes the oldest transfer unit(s) that may be on the oldest media in the data storage hierarchy, or oldest transfer unit(s) in a given virtual file system, if the hierarchy is organized by virtual file system. The data file retirement process examines the time of last access for each data file that is retired and places an entry in the retirement directory that corresponds to this temporal partition. Thus, each retirement directory segment is a journal of retired data files over a last accessed interval and also organized by domain. Each domain has a tree structure for its directory which can be parsed by file server 41–43 or volume and distributed over the local area network 1 to the corresponding file server.

Data Management System Software

Figure 10:
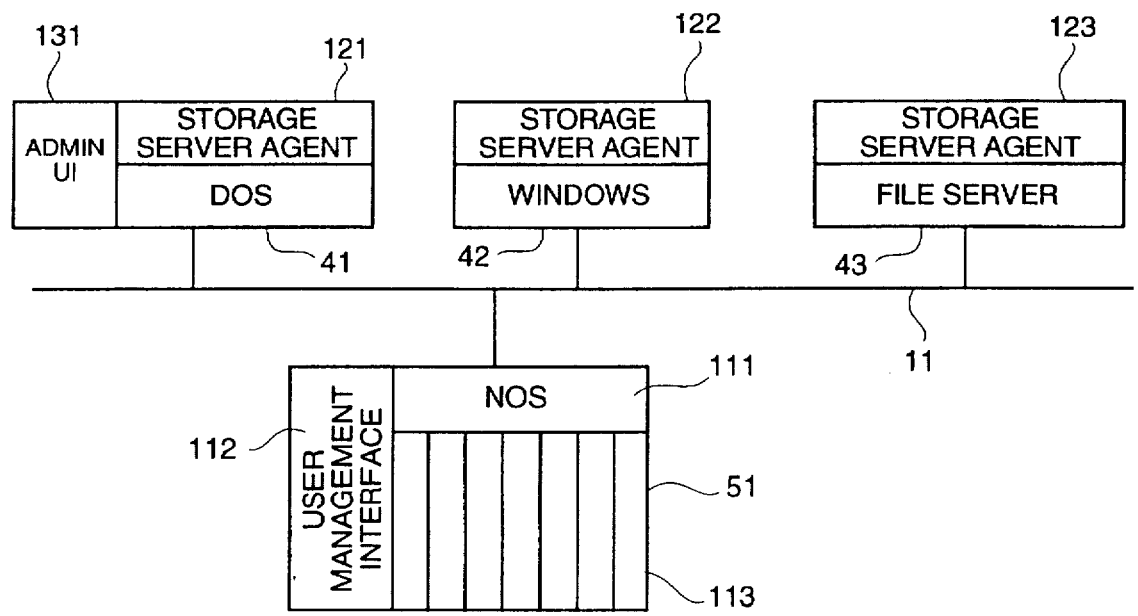
FIG. 10 illustrates in block diagram form various components of the hierarchical storage manager software.

The data management system software of the present invention manages the flow of data files throughout the system. The block diagram of FIG. 10 illustrates a conceptual client-server view of the network and the data management system software. The data communication link 11 of the local area network 1 is illustrated having the storage server processor 51 and three file systems 41–43 attached thereto. The storage server processor 51 includes the network operating system 111 as well as the data storage management system software consisting of various media and device management user interfaces 112 and control and services software 113. Each file server 41–43 includes a storage server agent 121–123 and any processor of the network can include and run an administrative user interface 131. The control and services software 113 looks at the system as a set of clients that are connected to the network 1 and which require services from the storage server 50.

Each file server 41–43 communicates with the storage server processor 51 via the resident storage server agent software 121–123. Thus, the data management system software is distributed throughout the network and serves to transparently integrate all the elements connected to the network into the data storage hierarchy.

The storage server agent 121–123 represents a component that is installed in each file server 41–43 in the local area network 1 and functions to redirect requests for migrated data files from the file server 41–43 which was the original repository of the requested data file to the storage server 50. The storage server agent 121–123 provides whatever interfaces are required to redirect data file access from the file server 41–43 to the storage server processor 51 and secondary storage 52. In the case of a processor 21, 22, 42 that interfaces to a user, the storage server 50 may provide the user with a notification that a time delay may be noted in accessing the requested data file. Thus, the storage server agent 121–123 has a personality that is tailored to the underlying client file server platform or environment. For example, where the file server is a database management server, the storage server agent interfaces with the database management system object manager to allow automatic migration and recall of database objects, which can be viewed as sub-files. Another example is the NetWare file system access manager which traps any NetWare supported file system calls at the file server. This also allows the automatic recall of migrated data files to be triggered.

Using these basic elements, numerous variations of the local area network 1 can be configured, having multiple processors 21, 22 and multiple file servers 41–43, each with their attached data storage devices 31–33. The processor 51 on which the storage server software runs includes a physical interface to the data communication link 11 of the local area network 1.

Real Time Network Storage Space Management

Figure 9:
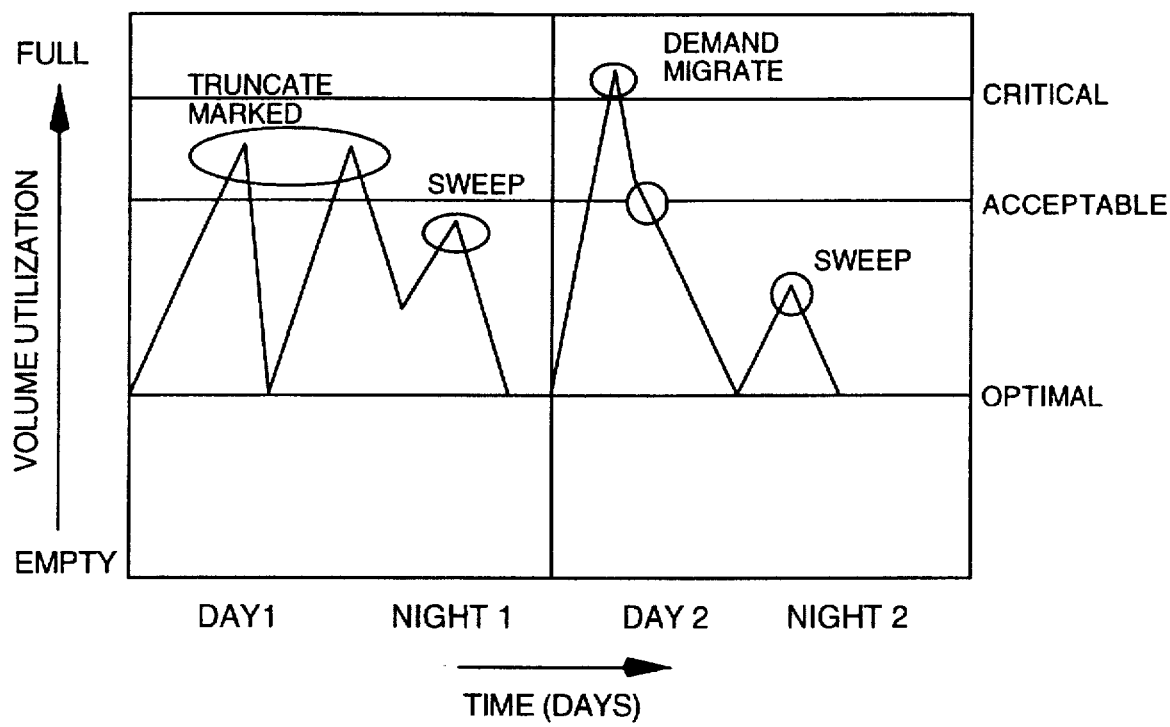
FIG. 9 illustrates in graphical form the data storage management processes of the present invention on a timewise basis.

FIG. 9 illustrates a chart of configured volume space utilization over time for a typical network volume in the primary storage. As can be seen from this chart, the level of network volume space utilization varies over time as a function of the actions of the data storage management system of the present invention. An unmanaged network volume suffers from monotonically increasing space utilization. When a configured network volume becomes overutilized, the user previously had to manually remove sufficient data files from the network volume to obtain adequate data storage space for use of the processor. The chart of FIG. 9 includes several predefined space utilization levels. These levels are listed as "critical", "acceptable", "optimal". The data storage management system activates various procedures within the hierarchical data storage management application as a function of the level of configured volume space utilization. Various peaks of the curve are designated by the name of the procedure that is activated at that time to reduce volume space utilization.

For example, "sweep" is a data storage space management procedure that is initiated on a routine basis. The sweep procedure is typically initiated at a predetermined time each day and runs to reduce the configured volume space utilization to a level below that labeled as optimal on the chart of FIG. 9. The sweep procedure migrates the lowest priority data files from the network volume to the media of the secondary storage 52 to ensure that there is an adequate quantity of available data storage space on the network volume each day as operations are initiated by the users of the various processors 21, 22 that are connected to the network 1. The space management procedures can include a plurality of concurrently operational space management rules. Thus, data files can be selected for migration as a function of the time of last access, size, quantity of data storage space available on the network volume. If management rules allow more data files to be migrated from a selected network volume to secondary storage 52 than required to reach the optimal level, these additional data files are "pre-migrated" to secondary storage 52. The pre-migration of data files entails migrating the data files to secondary storage 52 but not deleting (truncating) the data files from the network volume. The pre-migrated data files are marked as pre-migrated in the file system directory to indicate that the data files exist in both the network volume and the secondary storage 52.

In addition, during the day, a network volume tends to fill with data file expansion, data file copying and newly created data files. The space task of the hierarchical data storage management application continually monitors the level of configured volume space utilization. When a volume utilization threshold is exceeded between routine sweep operations, the space task initiates one of the space management procedures to reduce the volume space utilization to the next lowest threshold. For example, when the level of volume utilization is between the acceptable and critical levels, the space task begins to truncate pre-migrated data files until the level of volume utilization is reduced below the acceptable level. The pre-migration of data files thereby enables the data storage management system to instantly provide additional data storage space when the level of volume utilization is excessive. Similarly, when the level of volume utilization exceeds the critical level, the critical migrate job is scheduled for immediate execution and functions to move the lowest priority data files to secondary storage until the acceptable level has been reached.

The data file migration processes can be configured in various ways to customize the space management task. In particular, while the sweep process is normally activated during times of lowest network activity, the sweep process can be continually operational as a background procedure, with the level of sweep activity being controllable to suit the space management requirements. Thus, the sweep operation can include an "accelerator" capability. In addition, the sweep operation can be activated upon the completion of the demand migration process or the critical migration process to bring the level of volume utilization down to the optimal level. The sweep operation can also be concurrently operational with the data file recall operation since the system is a multiprocess system.

Routine Sweep Operation

Figure 5:
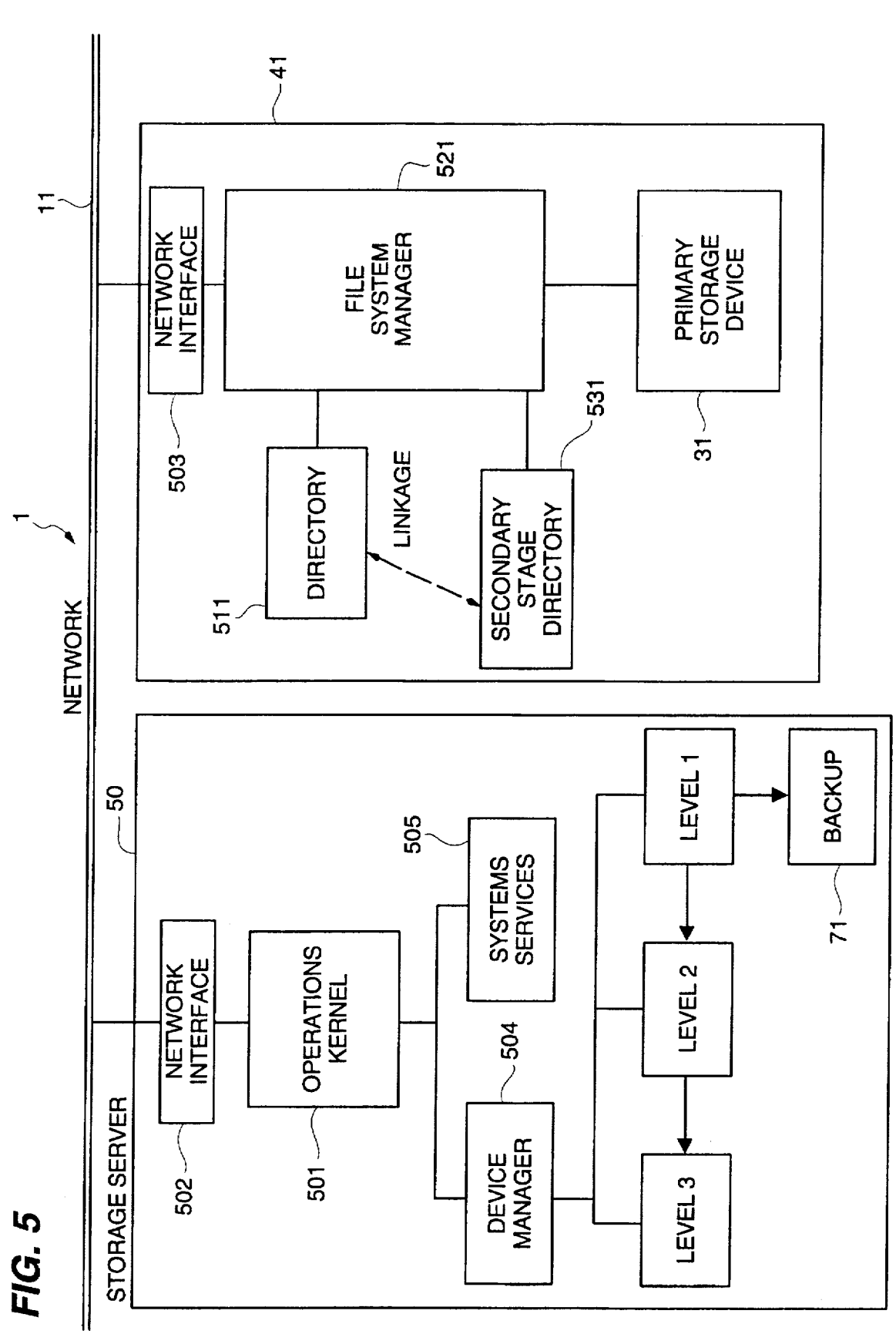
FIG. 5 illustrates in block diagram form the data file migration and backup paths taken in the data storage management system.
Figure 6:
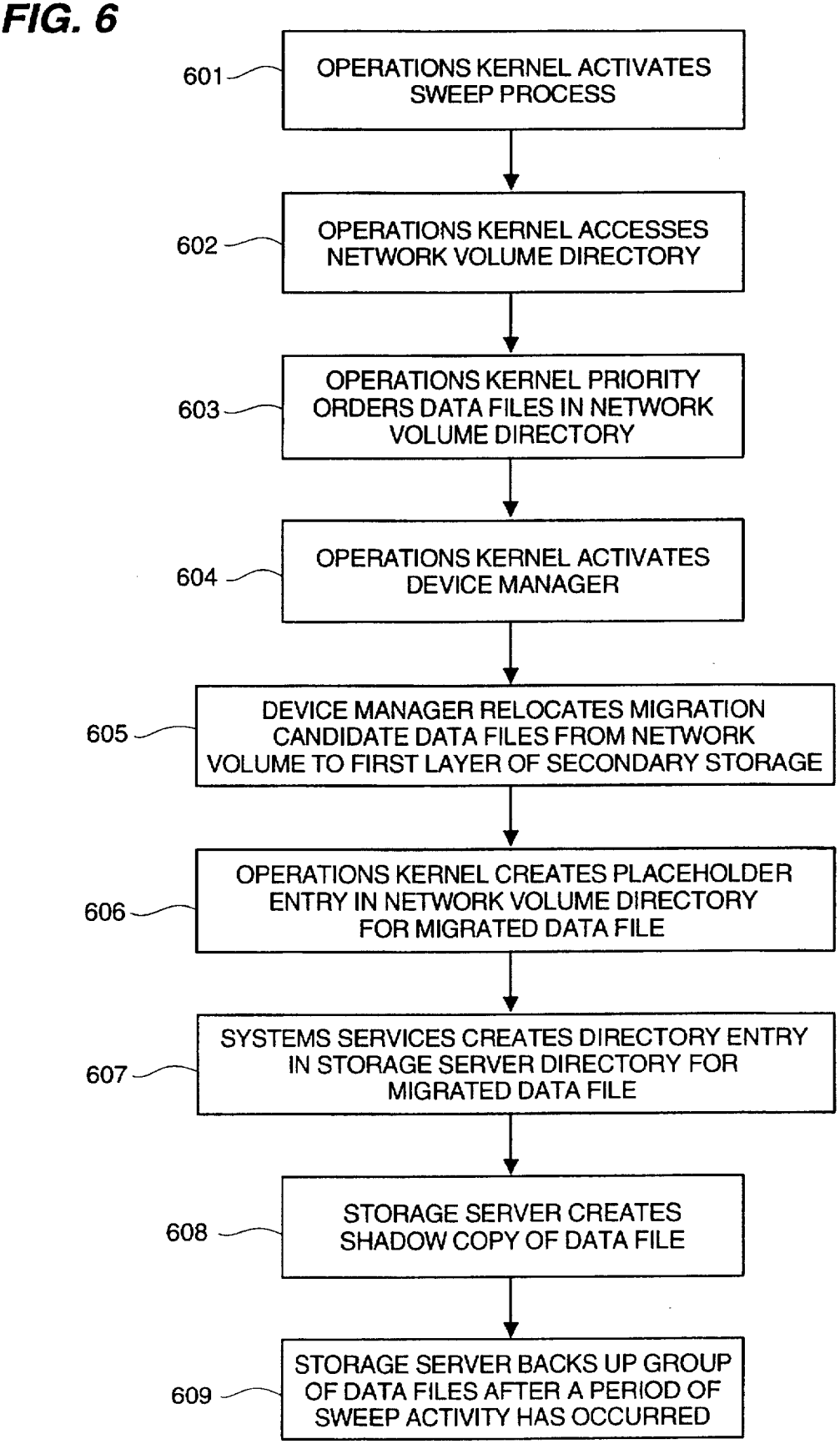
FIG. 6 illustrates in flow diagram form the operational steps taken by the apparatus of the present invention to perform a routine sweep operation.

FIG. 5 illustrates the various paths used in a data file migration operation while FIG. 6 illustrates in flow diagram form the operational steps taken by the data storage management application to perform the routine sweep operation. The sweep operation in activated on a routine basis, such as at a predetermined time each night. As illustrated in FIG. 10, each client application program (such as DOS®, Windows™, NetWare File Server) is provided with a storage service agent module 121–123 whose personality is tailored to match the underlying client platform. In addition, an administrative user interface 131 is provided to implement the following software modules: storage manager, media manager, device manager, backup manager. The storage manager provides general job, configuration, setup and system information monitoring functions. The media manager provides media-specific operations such as copy media and restore media. The device manager provides device specific operations such as add a device and delete a device.

The backup manager provides backup operations, such as definition of the number of backup sets, rotation definitions and redundancy. The number and function of the various modules is a matter of design choice and are noted here simply to illustrate the invention.

When the sweep operation is initiated at step 601 at the predetermined time, the operations kernel 501 in storage server processor 51 accesses at step 602, via network interface 502, data communication link 11 and network interface 503, the data file directory 511 that is stored in memory associated with file system manager 521 in file server 41. The contents of all the network volumes stored in data storage device 31 which is part of file server 41 are listed in directory 511. File system manager 521 typically manages directory 511, which lists the data file, its storage location and attributes. Operations kernel 501 at step 603 orders all the data files in each managed network volume in a predetermined manner into a priority list, such as a least recently used list. The bottom entries of the list represent the present migration candidate set. The migration candidates are selected based on a number of data file attributes, such that the set of management candidates are of sufficient extent to provide sufficient free data storage space to satisfy the free space objectives for this managed network volume. In addition, these management candidates have been inactive for a period of time greater than a minimum inactive period.

The device manager 504 of storage server 50 is activated at step 604 by operations kernel 501 and at step 605 sweeps the migration candidates from the selected managed network volume, transmits and assembles them into a transfer unit within the top layer 311 in the secondary storage 52. FIG. 5 illustrates the migrated data file path through the data storage management system. In particular, the migration candidate data file is selected by the operations kernel 501 and removed from the managed volume of data storage device 31, after transmitting the data file via network interface 503, the data communication link 11 of network 1 and network interface 502 to the storage server 50 and checking that the data file has been transferred correctly. Storage server 50 thus writes the transfer unit containing the transferred data file and other data files to level 1 (311) of the secondary storage 52.

The data file is listed in the directory 511 of the network volume on which the processor 21 has written the data file. This directory listing is modified by the operations kernel 501 at step 606 to enable the processor 21 to obtain the data file whether it is stored on the managed volume in the network volume or on a volume in the secondary storage 52. This is accomplished by the operations kernel 501 providing a "placeholder entry" in the directory 511 of the managed volume. This entry lists the data file as having an extent of "0" and data is provided in the directory attributes or metadata area for the data file that points to the catalog entry, created at step 607 by systems services 505, in the secondary storage directory 531 that lists the storage location in the secondary storage 52 that contains the migrated data file. The directory of the location of a particular data file in secondary storage 52 is maintained in the network volume itself. This is accomplished by the use of a secondary storage directory 531 that is maintained in file server 41 by the operations kernel 501 and systems services 505 of storage server 50. The directory 511 and secondary storage directory 531 can both be written on the data storage device 31 of file server 41.

The use of a key or pointer in the placeholder entry to indicate the secondary storage directory entry for the requested data file is preferably accomplished by storing the key as part of the data file attributes. This enables both the placeholder entry and the secondary storage directory to survive data file renaming activity on the part of the requesting processor. File systems commonly rename data files and if the key were part of the file name, it would be lost in the renaming activity. However, data file attributes are preserved as part of a data file renaming procedure. When a data file rename occurs, the name ascribed to this data file is modified and the entry in the network directory is suddenly placed in a different part of the file system primary storage directory. The data file attributes are transported in unmodified form with the new data file name and, since the placeholder is part of the data file attributes, the newly renamed data file attributes still point to the correct secondary storage directory entry and the rename is thereby transferred to the secondary storage directory automatically. Thus, the virtual segment of the file system automatically tracks the renaming of the data files in the primary segment of the file system.

The migrated data file is received by the storage server 50 and written at a selected available data storage space in a migration volume of a data storage device 61 in level one 311 of the secondary storage 52. In addition, if shadow volumes 65 are provided in the secondary storage 52 for data reliability purposes, the migrated data file is also written at step 608 into selected available data storage space on one of the shadow volumes 65. Groups of data files stored on the shadow volumes 65 are also periodically dumped after a period of sweep activity has occurred at step 609 via a special backup drive 71 on to backup media element 72 to ensure disaster recovery capability. To more efficiently manage data files in the hierarchy, the operations kernel 501 can assemble a plurality of data files into a transfer unit of predetermined size for continued migration to lower levels in the hierarchy. A candidate size for the transfer unit is a standard object size for the media that is used to implement the first layer 311 of the secondary storage 52. It is desirable that the transfer units that are used in the secondary storage 52 fit into all media with minimum boundary fragmentation.

The data files that are written to the migration volumes 61 and shadow volumes 65 have their physical storage location identification written into a secondary storage directory owned by the storage server 50. This directory can be implemented entirely within the storage server 50, but would take up a great deal of data storage space and be difficult to protect. Instead, this directory is distributed among the file servers 41–43 that contain managed volumes 31–33 for the processors 21, 22, with each piece of the directory representing the secondary storage directory 531 for the managed volume on the primary data storage device 31–33. The placeholder entry in the file server 41–43 points to this directory entry in the secondary storage directory 531. Thus, the processor 21 that requests access to this migrated data file can obtain the requested data file without being aware of the existence of the secondary storage 52. This is accomplished (as described in detail below) by the storage service agent 121, which obtains placeholder entry from the file server directory 511, which points to the directory entry in the secondary storage directory 531. This identified directory entry in the secondary storage directory 531 contains the address in the migration volume that contains the requested data file.

This data file migration procedure is replicated within the secondary storage 52 for each layer of the hierarchical data storage. Thus, as each layer of the secondary storage 52 becomes utilized in excess of a predetermined threshold, the data files are relocated to the next lower layer of the data storage hierarchy.

The particular segmentation of the storage server 50 illustrated herein between operations kernel 501, device manager 504 and system services 505 represents but one of a number of possible implementations of the functionality provided by storage server 50. It is anticipated that other divisions of responsibility among these elements or other combinations of elements are possible without departing from the concepts embodied in this description.

File Systems

Figure 13:
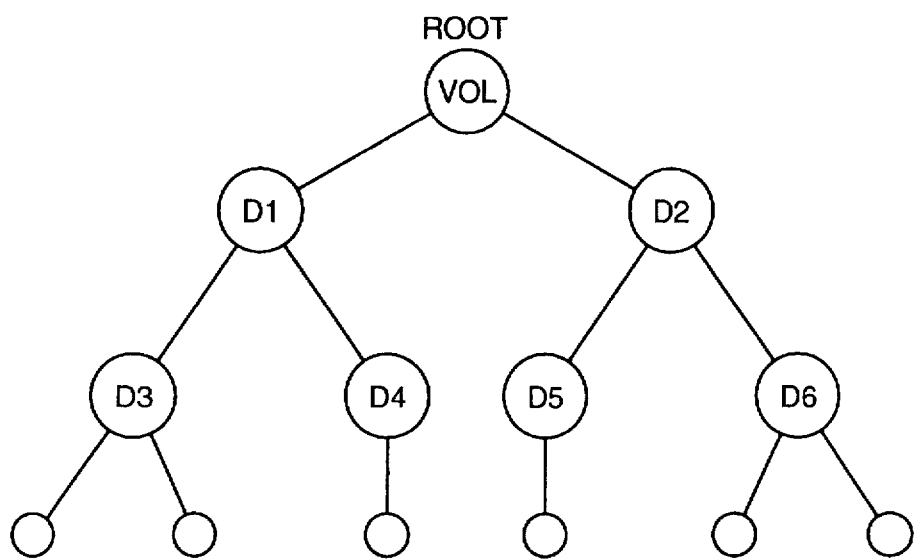
FIG. 13 illustrates a typical directory structure used by a file system.

The data management system makes use of a file system structure that provides a common repository for the potentially diverse file systems of the client file servers 41–43. The file system structure of the data management system must not only accept the data files from the file servers 41–43, but must also serve the backend data storage, data recall, data backup, data relocate and disaster recovery functions that are inherent in the data management system, wherein the media used for these functions can vary widely. The media can be an "update in place" media, such as magnetic disk, or can have only "append" capabilities, such as magnetic tape. The data file transfers are typically large in extent and must be such that data backup and data relocate operations can be performed in an efficient manner. Typical of file system architecture is a common DOS file system, whose architecture is illustrated in FIG. 13. This file system has four basic components:

1. File naming convention.
2. Directory architecture, to organize data files by name so they may be easily located.
3. Physical space allocation scheme that relates data file names to physical location on a data storage media, and which allows data storage space to be utilized and reclaimed when data files are deleted.
4. File management scheme, including access methods.

For example, DOS data files are named with a 1–8 byte name and a 0–3 byte extent, which are delimited by a "." (nnnnnnnn.xxx). The directory architecture is illustrated in FIG. 13 and takes the form of a hierarchical tree of directory names. The root is typically a volume, from which a number of directories branch. Each directory includes other directories and/or data files. A full data file name is represented by concatenating all the directory tree structure components from the root to the particular data file, with components being delimited by "\". An example of such a data file name using this convention is "\vol\dir1\dir3\filename.ext". Each DOS volume on the file server has its own unique file system. The physical space allocation on the data storage media is accomplished by the use of a File Allocation Table (FAT). The data storage space on a DOS volume is segmented into allocation units termed clusters. All directory and data file names in the volume are listed in the file allocation table and hierarchically related by linkages between parents and children in the directory tree. When a data file name in entered into the file allocation table, space is also provided for data file attributes such as hidden or read-only, and the identification of the first cluster used to store the data file is also noted. If additional clusters are required to store this data file, these clusters are linked in a chain via pointers, with the entire chain representing the physical location of the data file on the data storage media.

Transfer Units

The data management system of this invention makes use of a different directory structure to manage the storage of data files on the data storage media of the secondary storage 52. The storage and relocation of data files among the various layers of the secondary storage 52 is simplified by the use of transfer units. A transfer unit represents a block of data of predetermined size which contain virtual file system objects (e.g. data files) that move together to the backup system and through the hierarchy, with each transfer unit being assigned a unique identification within the data management system.

As noted above, the operations kernel 501 of the storage server processor 51 orders data files in each managed volume of the file systems 41–43 according to a predetermined algorithm. The ordering can be based on data file usage, content, criticality, size or whatever other criteria is selected. For the purpose of illustration, a simple least recently used (LRU) ordering is described. The operations kernel 501 orders the data files in each managed volume on an LRU basis and the entries on the bottom of the list represent migration candidates. The operations kernel 501 periodically sweeps the migration candidate data files from the managed volumes and assembles them serially by managed volume into a transfer unit containing a plurality of data files. The full data file name is entered into the secondary storage directory 531, together with data file location information: the location of the data file within the transfer unit, transfer unit identification, media object identification. The data file name is always logically related to the original transfer unit identification, the data file is never moved to another transfer unit, but remains in the transfer unit with the other temporally related data files from each virtual file system at the time of migration to secondary storage 52. The media object is itself associated with transfer units, not data files. In this manner, one directory is used to note the correspondence between data files and transfer unit and a second directory is used to note the correspondence between transfer units and media object. When transfer units are relocated from one media to another, the data file directory need not be updated since the data files remain in the original transfer unit and it is simply the change in location of the transfer unit on the media that must be noted.

The storage server processor 51 may not have sufficient data files to completely fill a transfer unit within a reasonable period of time. The storage server processor 51 writes a partial transfer unit to the secondary storage 52 and the backup media 82 upon the completion of a predetermined time interval. When additional migrated data files are received from the file servers, the storage server processor 51 rewrites the partially filled transfer unit with a complete transfer unit that comprises the previously written partial transfer unit with the additional received data files that completely fill the transfer unit. The storage server processor 51 tracks the partial nature of the transfer unit. The use of the partial transfer unit write process reduces the window of vulnerability since migrated data files are written to backup media on a periodic and timely basis.

Figure 11:
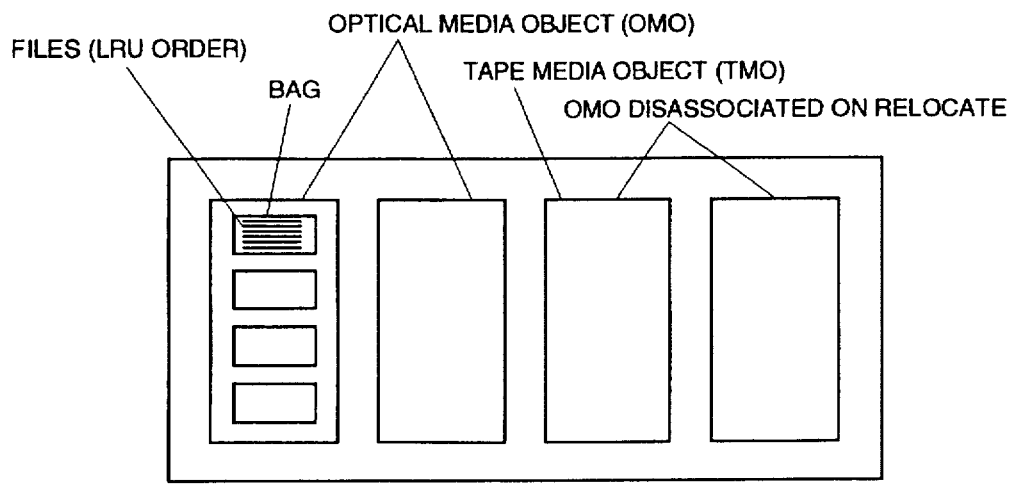
FIGS. 11 and 12 illustrate two embodiments of data transfer units used in data migration in the secondary storage.

This file system separates the logical allocation of data storage from the physical storage allocation, with the logical allocation for all layers of the data storage hierarchy being the same since the data file remains in its unique transfer unit. One significant advantage of this system is that when transfer units are migrated from layer to layer in the hierarchy or placed on a backup media, only the relationship between transfer unit identification and media object need be updated to reflect the new media on which this transfer unit is stored. Furthermore, the data file retains its relationship to the transfer unit in the backup system, and the backup media simply provides a redundant media object for the same transfer unit identification. The transfer unit is then written into the first layer 311 of the secondary storage 52. This procedure is used to relocate transfer units from one layer in the data storage hierarchy to the next lower layer in the data storage hierarchy. The block diagram of FIG. 11 illustrates the nested nature of the transfer units. Thus, the transfer unit of data files from the primary storage represents a data block of a first extent. The second layer transfer unit, assembled to relocate data files from the first layer of the hierarchical data storage to the second layer, can be composed of a plurality of first layer transfer units. Similarly, this process can be applied to successive layers of the data storage hierarchy. FIG. 11 illustrates the resultant stream of data that is written on to the lowest layer of the data storage hierarchy for a three layer secondary storage, consisting of a plurality of sequentially ordered second layer transfer units, each of which is comprised of a plurality of first layer transfer units.

Figure 12:
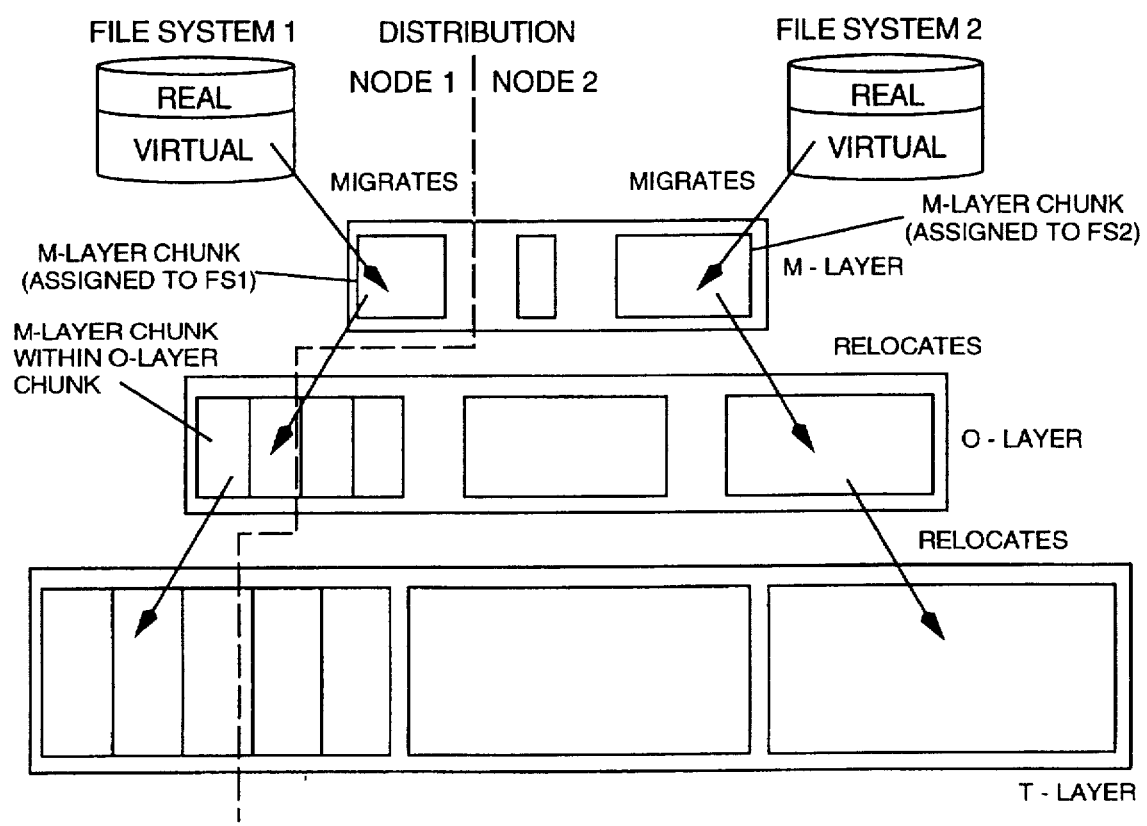

An alternate form of file system is illustrated in FIG. 12, wherein the physical allocation system is overlaid on the particular media type and hierarchy layer. Media at each layer of the data storage hierarchy is allocated in transfer units termed chunks for this approach, which have variable size, up to a predetermined maximum. If the underlying physical space allocation management permits, the chunks start small and grow according to need. Otherwise the chunks are pre-allocated in fixed size blocks and filled as needed. Only the data files from a particular network volume are stored in a selected chunk or plurality of chunks (chunk set) at each layer of the data storage hierarchy. Thus, the chunk set at a given layer represents the portion of the virtual file system that is stored at that layer. The block diagram of FIG. 12 illustrates the nested nature of the chunks. Thus, the chunk of data files from the primary storage represents a data block of a first extent, containing data files from only a single network volume. The second layer chunk assembled to relocate data files from the first layer of the hierarchical data storage to the second layer can be composed of a plurality of first layer chunks. Similarly, this process can be applied to successive layers of the data storage hierarchy. FIG. 12 illustrates the resultant stream of data that is written on to the lowest layer of the data storage hierarchy for a three layer secondary storage, consisting of a plurality of sequentially ordered second layer chunks, each of which is comprised of a plurality of first layer chunks.

Reconfiguration of Layers in the Hierarchy

The number and configuration of the layers of the hierarchy can be dynamically altered to suit the needs of the user. Additional layers can be added to the hierarchy or deleted therefrom. In addition, data storage capacity can be added or deleted from any selected layer of the hierarchy by the inclusion or exclusion of data storage devices from that selected layer. The data storage management system automatically adapts to such modifications of the hierarchy in a manner that ensures maximum performance and reliability. The shelf layer that is implemented by the backup drive 81 and the mountable backup data storage element 82 can provide an overflow capacity for the first layer 311 of the secondary storage 52 if no additional layers are provided, or for the lowest layer 313 if multiple layers are provided. Thus, when there is no longer any available data storage space on the lowest layer of the hierarchy, transfer units or media units are deleted from this layer. If additional data storage capacity in the form of additional data storage devices are added to this layer, or alternatively, an additional layer of media is provided below the previously lowest layer of media, the deleted transfer or media units can be returned to the hierarchy from the backup mountable data storage elements 82. This is accomplished by the storage server 51 noting the presence of newly added available data storage space on the lowest layer of the hierarchy and previously deleted transfer or media units. The storage server 51 accesses the media object directory to identify the location of the deleted data and retrieve this data from an identified backup mountable data storage element 82, which is mounted on backup drive 81. This retrieved data is then written on to the newly added media in available data storage space. This process is also activated if a data storage device is removed from a layer of the media or added to a layer of the media. If this media modification occurs in any but the lowest layer, the deleted transfer units or media objects are retrieved from the backup mountable data storage element 82 and stored on the media level immediately below the level on which the data storage device was removed.

Data File Recall

Figure 7:
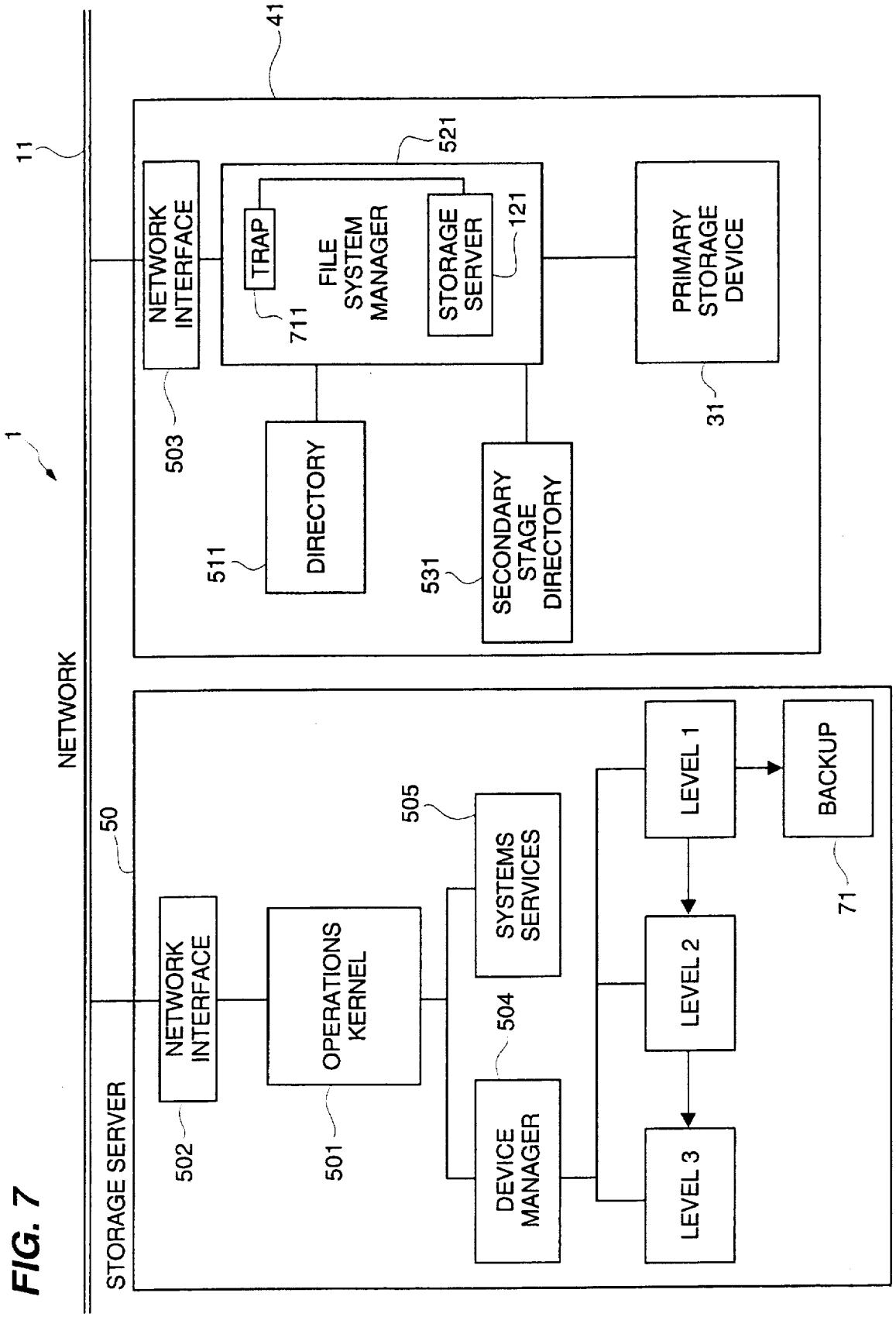
FIG. 7 illustrates in block diagram form the data file recall path taken in the data storage management system.
Figure 8:
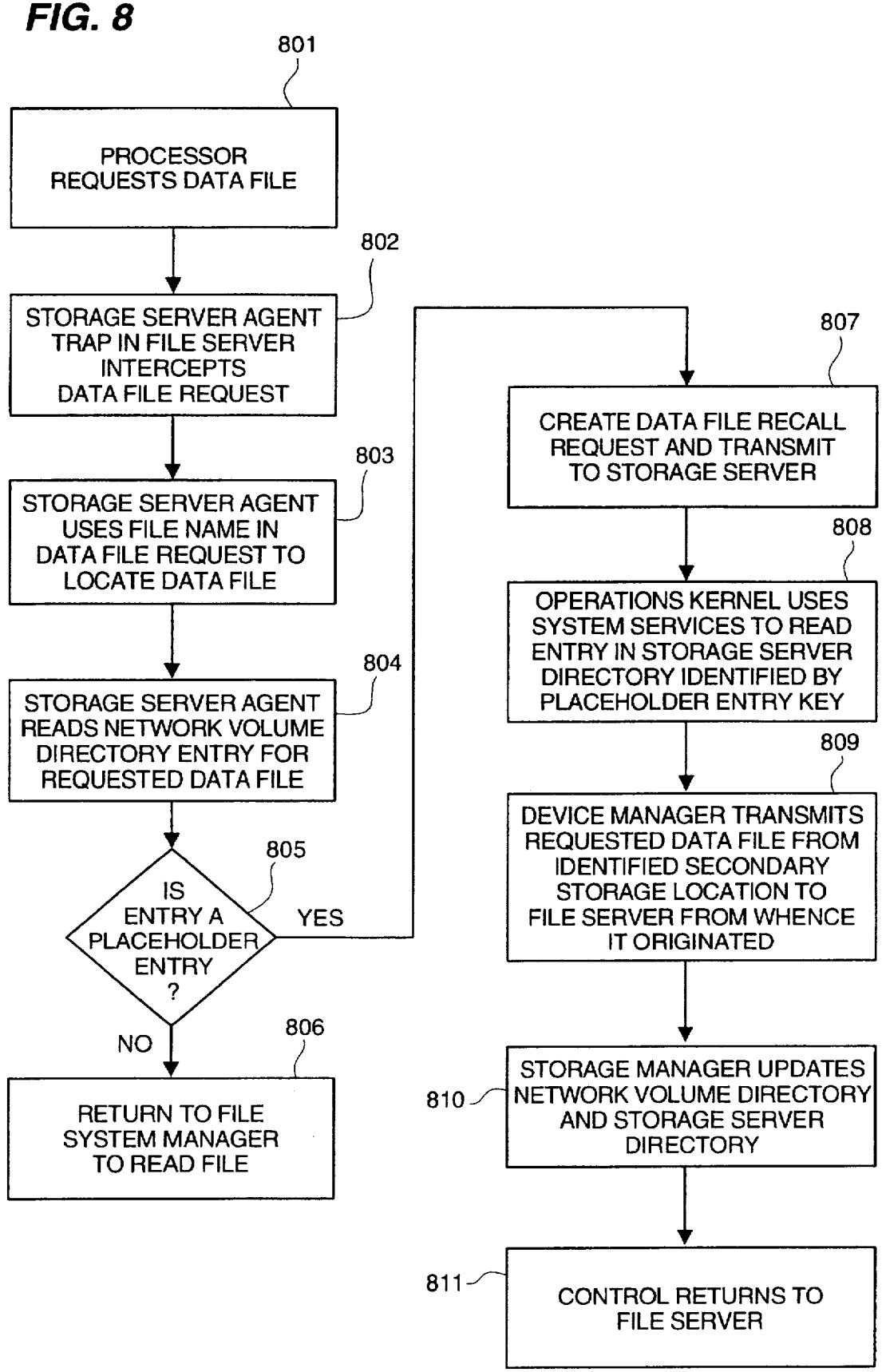
FIG. 8 illustrates in flow diagram form the operational steps taken by the apparatus of the present invention to perform a data file recall operation.

As illustrated in flow diagram form in FIG. 8 and with reference to the system architecture in FIG. 7, a data file recall operates in substantially the reverse direction of data file migration. As noted above, the data files that are written to the migration volumes 61 and shadow volumes 65 have their physical storage location identification written into a secondary storage directory 531 in the file server 41. The placeholder entry in directory 511 the file server 41 points to this secondary storage directory entry. Thus, the processor 21 at step 801 requests access to this migrated data file and this request is intercepted at step 802 by a trap or interface 711 in the file server 41. The trap can utilize hooks in the file system 41 to cause a branch in processing to the storage server agent 121 or a call back routine can be implemented that allows the storage server agent 121 to register with the file system 41 and be called when the data file request is received from the processor 21. In either case, the trapped request is forwarded to storage server agent 121 to determine whether the requested data file is migrated to secondary storage 52. This is accomplished by storage server agent 121 at step 803 reading directory 511 to determine the location of the requested data file. If a placeholder entry is not found stored in directory 511 at step 805, control is returned to the file server 41 at step 806 to enable the file server 41 to read the directory entry that is stored in directory 511 for the requested data file. The data stored in this directory entry enables the file server 41 to retrieve the requested data file from the data storage device 31 on which the requested data file resides. If at step 805, storage server agent 121 determines, via the presence of a placeholder entry, that the requested data file has been migrated to secondary storage 52, storage server agent 121 at step 807 creates a data file recall request and transmits this request together with the direct access secondary storage pointer key stored in the placeholder entry via network 1 to storage server 50. At step 808, operations kernel 501 uses systems services 505 which uses the pointer key to directly retrieve the entry in secondary storage directory 531. This identified entry in the secondary storage directory 531 contains the address in the migration volume that contains the requested data file. The address consists of the transfer unit identification and position of the data file in the transfer unit. The device manager 504 uses the data file address information to recall the requested data file from the data storage device on which it is stored. This data storage device can be at any level in the hierarchy, as a function of the activity level of the data file. Device manager 504 reads the data file from the storage location in the data storage device identified in the secondary storage directory 531 and places the retrieved data file on the network 1 for transmission to the file server 41 and volume 31 that originally contained the requested data file. Systems services 505 of operations kernel 501 then updates the secondary storage directory 531 and the directory 511 to indicate that the data file has been recalled to the network volume. At step 811, control is returned to file server 41, which reads directory 511 to locate the requested data file. The directory 511 now contains information that indicates the present location of this recalled data file on data storage device 31. The processor 21 can then directly access the recalled data file via the file server 41.

Disaster Recovery

There are a number of techniques used to protect the integrity of data files in the data management system of the present invention. In addition, primary storage backups are typically implemented to stream data files from each network volume on to a backup device (not shown). Within the data management system, the sweep routine produces data file streams, that represent a mixture of data files from the network volumes, which data are not only written to transfer units on to the data storage media of the first layer of secondary storage 52, but are also written from the data storage media of the first layer of secondary storage 52 on to backup media 72 on a backup device 71. Furthermore, this data is replicated on shadow volumes 65. The backup process periodically backs up the transfer units that are written on to the first layer of the secondary storage, even if the transfer units are only partially filled. If the backup media 72 is rotated off-site, a number of backup media 72 will contain various transfer units, each at a different level of completion. Each time a backup media 72 is mounted on backup device 71, device manager 505 updates any partially filled transfer units to the present level of completion to ensure that the backup media reflects the present state of the system.

A further level of data protection is provided as described above by the backup subsystem. When a media unit on the third layer 313 is filled, the contents of this media unit can be copied to a backup tape to construct a duplicate media unit termed the media replacement unit. This provides duplicate copies of the media unit and should the media unit stored on the third layer 313 fail, the media replacement unit provides full redundancy of all the data stored therein. The media replacement units are typically stored in an off-site repository to provide physical separation of the media in the event of fire or other possible event that could destroy or damage the media stored on-site. Thus, if a media failure occurs, the media replacement unit can be loaded in a library device in the system to immediately provide the data files, rather than having to stream this data from one media to another.

In addition, the secondary storage directory 531, since it is distributed on network volumes, is backed up on to the primary storage backup media as noted above. This metadata can also be optionally replicated into a data storage device of the secondary storage or backed up on to the backup media 72.

We claim:

1. A data storage management system for a data network which functions to interconnect a plurality of file servers, each of which stores data files, comprising:

secondary storage means for storing data files migrated from said file servers;

storage server means connected to said network for automatically managing transfer of data files, independent of said file servers, between said plurality of file servers and said secondary storage means;

means for collecting a plurality of data files, that are transmitted to said secondary storage means, into a transfer unit.

2. The system of claim 1 wherein said secondary storage means comprises:

a multi-layer hierarchical memory, wherein said layers in said hierarchical memory comprise media of differing characteristics.

3. The system of claim 2 wherein said hierarchical memory comprises a plurality of layers, which include memory devices comprised of media of at least one of the class of: magnetic media, optical media, and solid-state media.

4. The system of claim 2 wherein each layer of said hierarchical memory is connected to said storage server means.

5. The system of claim 2 wherein at least one of said layers comprises:

a plurality of data storage elements for storing data files migrated from said file servers;

at least one data storage element drive means for reading/writing data on a data storage element mounted in said data storage element drive means; and automated data storage element management means for robotically mounting a selected one of said plurality of data storage elements in said data storage element drive means.

6. The system of claim 1 wherein said storage server means comprises:

directory means for storing data indicative of a physical data storage location that identifies a locus in said secondary storage means of each of said data files migrated to said secondary storage means.

7. The system of claim 1 wherein said secondary storage means comprises a multi-layer hierarchical memory, wherein said layers in said hierarchical memory comprise media of differing characteristics, said storage server means comprises:

means for storing said transfer unit on a first layer of said hierarchy;

means for automatically relocating data files that are stored on a layer of said hierarchy to an other layer of said hierarchy as a function of predetermined criteria; and wherein said automatically relocating means transmits said transfer unit to said other layer in said hierarchy.

8. The system of claim 6 wherein said directory means comprises:

transfer unit directory means for storing data indicative of a correspondence between a data file and a transfer unit in which said data file is located; and media object directory means for storing data indicative of a correspondence between a transfer unit and a media on which said transfer unit is located.

9. The system of claim 8 wherein said storage server updates said media object directory means when a transfer unit is relocated from said media on which said transfer unit is located to another media in said hierarchy.

10. The system of claim 7 further comprising:

backup means for writing each said transfer unit written on said first layer of said hierarchy on to a mountable data storage element.

11. The system of claim 10 wherein said backup means writes a partially filled transfer unit on to said mountable data storage element upon expiration of a predetermined time interval absent sufficient data files to fill a transfer unit.

12. The system of claim 11 wherein said backup means overwrites a partially filled transfer unit on said mountable data storage element with a filled transfer unit that includes all data files written in said partially filled transfer unit.

13. The system of claim 10 wherein said storage server means is responsive to loss of a requested data file in an assigned transfer unit for retrieving said requested data file from said backup means by reading at least a portion of said assigned transfer unit from said mountable data storage element to recover said lost data files.

14. The system of claim 10 wherein said storage server means further comprises:

means, responsive to lack of further available data storage space on a lowest layer of said hierarchy, for deleting at least one selected transfer unit from said lowest layer.

15. The system of claim 14 wherein said storage server further comprises:

means, responsive to addition of a layer of media to said hierarchy lower than said lowest layer, for transferring said selected deleted transfer unit from said backup means to said added layer of media by reading said selected deleted transfer unit from said mountable data storage element.

16. The system of claim 14 wherein said storage server further comprises:

means, responsive to addition of data storage capacity to said lowest layer, for transferring said selected deleted transfer unit from said backup means to said added data storage capacity by reading said selected deleted transfer unit from said mountable data storage element.

17. The system of claim 10 wherein said storage server means further comprises:

means, responsive to removal of available data storage space on a selected layer of said hierarchy, for deleting all transfer units stored on said removed available data storage space from said selected layer.

18. The system of claim 17 wherein said storage server further comprises:

means, responsive to available data storage capacity in a layer lower in said hierarchy than said selected layer, for transferring said deleted transfer units from said backup means to said available data storage capacity by reading said deleted transfer units from said mountable data storage element.

19. The system of claim 10 wherein at least one of said layers comprises:

shelf layer comprising at least one mountable data storage element that contains data files migrated from said file servers and whose locations on said data storage element are maintained in said directory means.

20. The system of claim 19 wherein said shelf layer mountable media comprises said backup mountable media.

21. The system of claim 19 wherein one of said layers comprises:

retirement layer comprising at least one mountable data storage element that contains data files migrated from said file servers and whose directory entries are purged from said transfer unit directory means.

22. The system of claim 19 wherein said storage server means is responsive to loss of a mountable data storage element in said shelf layer for retrieving said mountable data storage element from said backup means by reading all transfer units that were stored on said lost mountable data storage element from said mountable backup data storage element.

23. The system of claim 19 wherein said storage server means is responsive to loss of a media in one of said layers for retrieving said lost media from said backup means by reading all transfer units that were stored on said lost media from said mountable backup data storage element.

24. The system of claim 7 wherein said storage server means further comprises:

means for determining a size of said transfer unit as a function of said media on said next lower layer.

25. The system of claim 1 wherein said storage server means comprises:

means, located in each of said file servers, for intercepting a call at a selected file server to data files that have been migrated to said secondary storage means; and means responsive to said intercepting means for recalling said migrated data files from said secondary storage means to said selected file server.

26. The system of claim 1 wherein said network includes a directory for identifying a storage location of data files on said file servers, said storage server means comprises:

means for writing in said network directory at a directory location for each migrated data file, data indicating that said data file has been migrated to said secondary storage means.

27. The system of claim 26 wherein said storage server means comprises:

means, located in each of said file servers, for intercepting a call at a selected file server to data files that have been stored in said file server; and means, responsive to said data written in said network directory indicating that said requested data file has been migrated to said secondary storage means, for recalling said requested data file from said secondary storage means to said file server.

28. The system of claim 27 wherein said storage server means comprises:

directory means for storing data indicative of a physical data storage location that identifies a locus in said secondary storage means of each of said data files migrated to said secondary storage means; and wherein said recalling means comprises:

means for reading said data stored in said directory means to identify a physical data storage location that identifies a locus in said secondary storage means of said requested migrated data file, and means for transmitting said requested migrated data file from said locus in said secondary storage means to said selected file server.

29. The system of claim 26 wherein said storage server means comprises:

directory means for storing data indicative of a physical data storage location that identifies a locus in said secondary storage means of each of said data files migrated to said secondary storage means; and wherein said data written by said writing means in said network directory at a directory location for a selected migrated data file identifies a data storage location in said directory means that stores data indicative of a physical data storage location that identifies a locus in said secondary storage means of said selected migrated data file.

30. The system of claim 26 wherein said data written by said writing means in said network directory at a directory location for a selected migrated data file is stored as part of the data file attributes.

31. The system of claim 1 wherein said network includes a directory for identifying a storage location of data files on said file servers, said storage server means includes data file migration means comprising:

means for looking at said network directory to obtain data relating to data files stored on a selected file server, which data indicates various characteristics of said data files.

32. The system of claim 31 wherein said data file migration means further comprises:
means for ordering data files stored on said selected file server into a priority ordering by selected characteristics of said data files.

33. The system of claim 32 wherein each said file server contains a plurality of volumes of data storage, said data file migration means further comprises:
means for reviewing each volume of said at least one file server to identify lowest priority data files stored thereon.

34. The system of claim 33 wherein said data file migration means further comprises:
means for transmitting at least one of said identified lowest priority data files to said secondary storage means.

35. The system of claim 34 wherein said storage server means further comprises:
means for activating said data file migration means for successive lowest priority data files until available memory in a volume of said selected file server is at least as great as a predefined threshold.

36. The system of claim 34 wherein said storage server means further comprises:
means for scheduling activation of said data file migration means on a temporal basis.

37. The system of claim 34 wherein said storage server means further comprises:
means for activating said data file migration means as a function of volume space utilization.

38. The system of claim 34 wherein said storage server means further comprises:
means for activating said data file migration means as a function of activity on said data network.

39. The system of claim 35 wherein said data file migration means further comprises:
means for copying at least one of said priority ordered data files from said selected file server to said secondary storage means; and
means responsive to a subsequent determination of insufficient available data storage space on said selected file server for utilizing data storage space occupied by said copied at least one said priority ordered data files as available data storage space.

40. The system of claim 1 wherein said secondary storage means comprises a multi-layer hierarchical memory, said storage server means comprises:
means for collecting a plurality of data files, that are transmitted to said secondary storage means, into a transfer unit;
means for storing said transfer unit on a first layer of said hierarchy;
wherein said secondary storage means further comprises:
means for storing a duplicate copy of said transfer unit stored on said first layer of said hierarchy.

41. The system of claim 1 wherein said secondary storage means comprises a multi-layer hierarchical memory with a lowest layer of said hierarchy being divided into a plurality of media units for storing data files relocated from hierarchically senior layers, said secondary storage means further comprises:
means, responsive to a one of said plurality of media units exhausting available data storage space thereon, for storing a duplicate copy of said media unit on a media replacement unit element.

42. The system of claim 41 wherein said storage server means is responsive to loss of a media unit for retrieving said lost media unit from said media replacement unit element by reading all data files that were stored on said lost media unit from said media replacement unit element.

43. The system of claim 41 wherein said media replacement unit element comprises a mountable data storage element.

44. The system of claim 1 wherein said secondary storage means comprises a multi-layer hierarchical memory, wherein said layers in said hierarchical memory comprise media of differing characteristics, said storage server means comprises:
means for collecting a plurality of data files, that are transmitted to said secondary storage means, into a transfer unit;
means for storing said transfer unit on a first layer of said hierarchy;
means for automatically relocating said transfer units that are stored on said first layer of said hierarchy to an other layer of said hierarchy as a function of predetermined criteria; and
wherein said automatically relocating means transmits a plurality of said transfer units assembled into a media unit to said other layer in said hierarchy for storage thereon.

45. A method for storing data files in a data storage management system for a data network which functions to interconnect a plurality of file servers, each of which stores data files, which data storage management system comprises a secondary storage element and a storage server element connected to said network, comprising the steps of:
storing data files migrated from said file servers on said secondary storage element;
automatically managing transfer of data files, independent of said file servers, between said plurality of file servers and said secondary storage element; and
collecting a plurality of data files, that are transmitted to said secondary storage element, into a transfer unit.

46. The method of claim 45 wherein said secondary storage means comprises a multi-layer hierarchical memory, wherein said layers in said hierarchical memory comprise media of differing characteristics which include memory devices comprised of media of at least one of the class of: magnetic media, optical media, and solid-state media.

47. The method of claim 46 wherein said secondary storage means comprises a multi-layer hierarchical memory and wherein at least one of said layers comprises a plurality of data storage elements for storing data files migrated from said file servers and at least one data storage element drive for reading/writing data on a data storage element mounted in said data storage element drive, said method further comprises the step of:
robotically mounting a selected one of said plurality of data storage elements in said data storage element drive means.

48. The method of claim 47 further comprising the step of:
storing in a directory data indicative of a physical data storage location that identifies a locus in said secondary storage element of each of said data files migrated to said secondary storage element.

49. The method of claim 45 wherein said secondary storage element comprises a multi-layer hierarchical memory, wherein said layers in said hierarchical memory comprise media of differing characteristics, said method further comprises:

storing said transfer unit on a first layer of said hierarchy;

automatically relocating data files that are stored on a layer of said hierarchy to an other layer of said hierarchy as a function of predetermined criteria; and transmitting said transfer unit to said other layer in said hierarchy.

50. The method of claim 48 wherein said method further comprises the step of:

storing in a transfer unit section of said directory data indicative of a correspondence between a data file and a transfer unit in which said data file is located; and storing in a media object section of said directory data indicative of a correspondence between a transfer unit and a media on which said transfer unit is located.

51. The method of claim 50 wherein said storage server element updates said media object directory when a transfer unit is relocated from said media on which said transfer unit is located to another media in said hierarchy.

52. The method of claim 49 further comprising the step of:

writing each said transfer unit written on said first layer of said hierarchy on to a mountable backup data storage element.

53. The method of claim 52 wherein said step of writing writes a partially filled transfer unit on to said mountable backup data storage element upon expiration of a predetermined time interval absent sufficient data files to fill a transfer unit.

54. The method of claim 53 wherein said step of writing overwrites a partially filled transfer unit on said mountable backup data storage element with a filled transfer unit that includes all data files written in said partially filled transfer unit.

55. The method of claim 54 further comprising the step of:

retrieving, in response to loss of a requested data file in an assigned transfer unit, said requested data file from said mountable backup data storage element by reading at least a portion of said assigned transfer unit from said mountable backup data storage element to recover said lost data file.

56. The method of claim 52 further comprising the step of:

deleting, in response to lack of further available data storage space on a lowest layer of said hierarchy, for deleting at least one selected transfer unit from said lowest layer.

57. The method of claim 56 further comprising the step of:

transferring, in response to addition of a layer of media to said hierarchy lower than said lowest layer, said selected deleted transfer unit from said backup mountable data storage element to said added layer of media by reading said selected deleted transfer unit from said mountable backup data storage element.

58. The method of claim 56 further comprising the step of:

transferring, in response to addition of data storage capacity to said lowest layer, said selected deleted transfer unit from said backup mountable data storage element to said added data storage capacity by reading said selected deleted transfer unit from said mountable backup data storage element.

59. The method of claim 56 further comprising the step of:

deleting, in response to removal of available data storage space on a selected layer of said hierarchy, all transfer units stored on said removed available data storage space from said selected layer.

60. The method of claim 59 further comprising the step of:

transferring, in response to available data storage capacity in a layer lower in said hierarchy than said selected layer, said deleted transfer units from said backup mountable data storage element to said available data storage capacity by reading said deleted transfer units from said mountable backup data storage element.

61. The method of claim 52 wherein at least one of said layers comprises a shelf layer comprising at least one mountable data storage element that contains data files migrated from said file servers and whose locations on said data storage element are maintained in said directory, wherein said shelf layer mountable media comprises said backup mountable media.

62. The method of claim 61 wherein one of said layers comprises a retirement layer comprising at least one mountable data storage element that contains data files migrated from said file servers and whose directory entries are purged from said transfer unit directory.

63. The method of claim 61 further comprising the step of:

retrieving, in response to loss of a mountable data storage element in said shelf layer, said mountable data storage element from said backup mountable data storage element by reading all transfer units that were stored on said lost mountable data storage element from said mountable backup data storage element.

64. The method of claim 61 further comprising the step of:

reading, in response to loss of a media in one of said layers for retrieving said lost media from said backup means, all transfer units that were stored on said lost media from said mountable backup data storage element.

65. The method of claim 49 further comprising the step of:

determining a size of said transfer unit as a function of said media on said next lower layer.

66. The method of claim 45 further comprising the steps of:

intercepting a call at a selected file server to data files that have been migrated to said secondary storage element; and recalling said migrated data files from said secondary storage element to said selected file server.

67. The method of claim 45 wherein said network includes a directory for identifying a storage location of data files on said file servers, said method further comprises the step of:

writing in said network directory at a directory location for each migrated data file, data indicating that said data file has been migrated to said secondary storage element.

68. The method of claim 67 further comprising the steps of:

intercepting a call at a selected file server to data files that have been stored in said file server; and recalling, in response to said data written in said network directory indicating that said requested data file has been migrated to said secondary storage means, said requested data file from said secondary storage element to said file server.

69. The method of claim 68 further comprising the steps of:

storing data in a directory, said data indicative of a physical data storage location that identifies a locus in said secondary storage element of each of said data files migrated to said secondary storage element; and wherein said step of recalling comprises:

reading said data stored in said directory to identify a physical data storage location that identifies a locus in said secondary storage element of said requested migrated data file, and transmitting said requested migrated data file from said locus in said secondary storage element to said selected file server.

70. The method of claim 67 further comprising the step of:

storing data in a directory, said data indicative of a physical data storage location that identifies a locus in said secondary storage element of each of said data files migrated to said secondary storage element; and wherein said data written by said step of writing in said network directory at a directory location for a selected migrated data file identifies a data storage location in said directory that stores data indicative of a physical data storage location that identifies a locus in said secondary storage element of said selected migrated data file.

71. The method of claim 67 wherein said data written by said step of writing in said network directory at a directory location for a selected migrated data file is stored as part of the data file attributes.

72. The method of claim 45 wherein said network includes a directory for identifying a storage location of data files on said file servers, said method includes a data file migration step comprising:

looking at said network directory to obtain data relating to data files stored on a selected file server, which data indicates various characteristics of said data files.

73. The method of claim 72 wherein said data file migration step further comprises:

ordering data files stored on said selected file server into a priority ordering by selected characteristics of said data files.

74. The method of claim 73 wherein each said file server contains a plurality of volumes of data storage, said data file migration step further comprises:

reviewing each volume of said at least one file server to identify lowest priority data files stored thereon.

75. The method of claim 74 wherein said data file migration step further comprises:

transmitting at least one of said identified lowest priority data files to said secondary storage element.

76. The method of claim 75 further comprising the step of:

activating said step of data file migration for successive lowest priority data files until available memory in a volume of said selected file server is at least as great as a predefined threshold.

77. The method of claim 75 further comprising the step of:

scheduling activation of said step of data file migration on a temporal basis.

78. The method of claim 75 further comprising the step of:

activating said step of data file migration as a function of volume space utilization.

79. The method of claim 75 further comprising the step of:

activating said step of data file migration as a function of activity on said data network.

80. The method of claim 74 wherein said step of data file migration further comprises:

copying at least one of said priority ordered data files from said selected file server to said secondary storage means; and utilizing, in response to a subsequent determination of insufficient available data storage space on said selected file server, data storage space occupied by said copied at least one said priority ordered data files as available data storage space.

81. The method of claim 45 wherein said secondary storage element comprises a multi-layer hierarchical memory, said method comprises:

collecting a plurality of data files, that are transmitted to said secondary storage element, into a transfer unit;

storing said transfer unit on a first layer of said hierarchy;

storing a duplicate copy of said transfer unit stored on said first layer of said hierarchy.

82. The method of claim 45 wherein said secondary storage element comprises a multi-layer hierarchical memory with a lowest layer of said hierarchy being divided into a plurality of media units for storing data files relocated from hierarchically senior layers, said method further comprises:

storing, in response to a one of said plurality of media units exhausting available data storage space thereon, a duplicate copy of said media unit on a media replacement unit element.

83. The method of claim 82 further comprising the step of:

reading, in response to loss of a media unit for retrieving said lost media unit from said media replacement unit element, all data files that were stored on said lost media unit from said media replacement unit element.

84. The method of claim 82 wherein said media replacement unit element comprises a mountable data storage element.

85. The method of claim 45 wherein said secondary storage element comprises a multi-layer hierarchical memory, wherein said layers in said hierarchical memory comprise media of differing characteristics, said method comprises:

collecting a plurality of data files, that are transmitted to said secondary storage element, into a transfer unit;

storing said transfer unit on a first layer of said hierarchy;

automatically relocating said transfer units that are stored on said first layer of said hierarchy to an other layer of said hierarchy as a function of predetermined criteria and wherein said plurality of said transfer units are assembled into a media unit as transmitted prior to transmission to said other layer in said hierarchy for storage thereon.

\* \* \* \* \*